United States Patent

[11] 3,584,665

| [72] | Inventor | Giuseppe Gemmani<br>Via Morecchiesi 40, 47037 Rimini, Italy |
|---|---|---|
| [21] | Appl. No. | 859,963 |
| [22] | Filed | Sept. 22, 1969 |
| [45] | Patented | June 15, 1971 |
| [32] | Priority | Nov. 13, 1968 |
| [33] | | Italy |
| [31] | | 1806A/68 |

[54] DOUBLE ROLLER COPIER DEVICE
2 Claims, 4 Drawing Figs.

[52] U.S. Cl. .................................................. 144/145, 90/13
[51] Int. Cl. .................................................. B27c 5/02

[50] Field of Search .................................................. 144/145, 145-1, 137, 144; 90/13

[56] References Cited
UNITED STATES PATENTS

| 569,054 | 10/1896 | Purdy | 144/145-1 |
| 1,567,865 | 12/1925 | Sawyer | 144/145 |
| 3,459,104 | 8/1969 | Parsons | 144/145 X |

Primary Examiner—Donald R. Schran
Attorneys—Guido Modiano and Albert Josif

ABSTRACT: This disclosure relates to a copier device for use on a wood-shaping machine, said device comprising a pair of rollers arranged above the machine work table for the entrainment of the pattern or template and the piece to be worked.

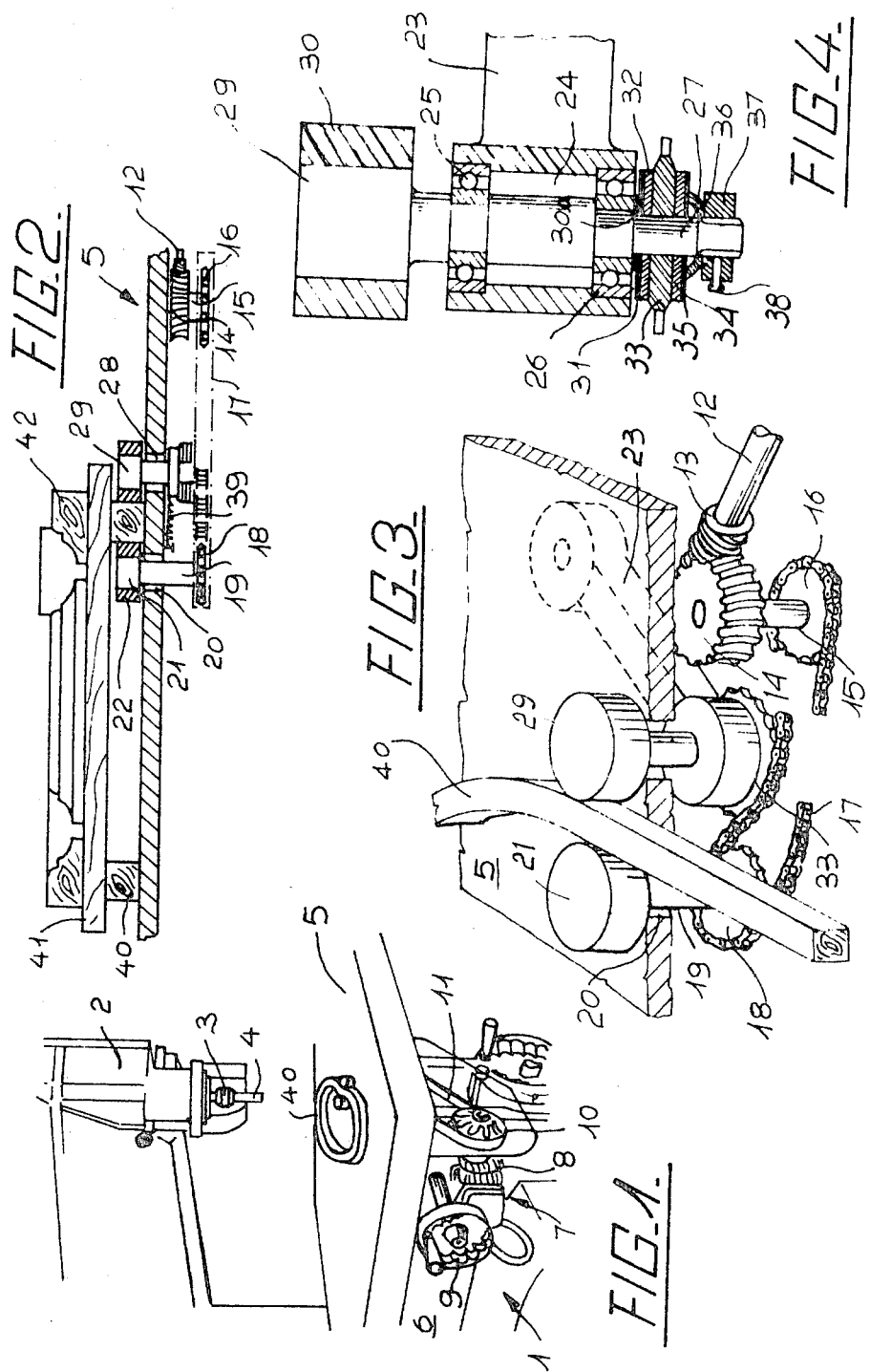

DOUBLE ROLLER COPIER DEVICE

BACKGROUND OF THE INVENTION

The present invention relates to a copier device for molding machines which has two rollers for the entrainment of the pattern and the piece to be worked, such device being particularly suitable for machines for working wood and the like materials.

Slotting and molding operations are normally effected in series on molding machines of the type with the toolholder spindle extending from the machine table (planer-type) or on machines of the type in which the machine head is arranged above the work table millers, these machines being supplied with devices for reproducing or copying a profile or template.

The profile-copying devices at present employed on machines for working wood and the like materials are of a single type, namely profile-copying devices driven by means of a chain and pinions. These devices, which are very simple in principle, include a member which is preferably formed in plywood and has its outer edge (or inner edge in the case of a hole to be reproduced) profiled according to the molding to be effected. This shaped edge abuts against a roller under the action of suitable pressing means and is subject to the action of a driving unit comprising a toothed pinion which meshes with a chain fixed adjacent the edge of the member which abuts against said roller, said pinion being subject to the action of rotation means.

Copier devices constructed in this manner have various drawbacks amongst which the most important is that neither the type with a shaped outer edge or profile nor the type with a shaped inner edge permit slots to be formed in which the line followed by the center of the miller must have deviations with a sharp angle greater than 45°: in this case in fact the teeth of the pinion are not able to disengage themselves from the chain and it is therefore necessary to blend the angle from the chain and it is therefore necessary to blend the angle. Both types are then subject to the inconvenience that the advance is not regular and uniform.

The main object of the present invention is that of providing a copier unit for machines for working wood and the like materials which is free from the above indicated disadvantages and, more particularly, does not have substantial limitations in relation to the radii of curvature of the shaping to be effected.

Another object of the invention is that of providing a copier unit which can be employed on any molding machine whether it is of the planer-type or the miller type.

Another object of the invention is that of providing a copier device in which the work advance of the piece is uniform and constant irrespective of the manner in which the profile of the molding to be effected is moved.

A further object of the invention is that of providing a copier unit which because of its particular structure only requires templates which are very simple and thus of rapid and economic preparation. This contrasts with conventional copiers driven by chain and pinion in which the preparation of a template is a lengthy job which is consequently costly and difficult to carry out, above all as regards the fixing of the chain.

A further object of the invention is that of providing a copier device in which the shape of the template is not limited by any extraneous member as occurs with chain driven copiers in which the shape of the template is limited by the pitch of the chain employed.

SUMMARY OF THE INVENTION.

According to the invention there is provided a copier device for molding machines, characterized in that it comprises a pair of counterrotating rollers arranged above the work table of the machine with their axes perpendicular to the surface of the worktable, the distance between the axes of the rollers being variable over a limited range of values against the action of resilient means, between said rollers there being interposable a template which has a constant thickness and is fixed to the lower side of a table which carries a piece to be worked, said rollers being rotated in opposite directions by a rotary motion source, and at least one of said rollers being connected to said rotary motion source by means which enable the roller to rotate at a variable peripheral speed with respect to the other roller.

BRIEF DESCRIPTION OF THE DRAWINGS.

The invention will appear more clearly from the following detailed description of a preferred embodiment of a copier device according to the invention, illustrated by way of example in the accompanying drawing in which:

FIG. 1 is a perspective view of the front portion, corresponding to the work zone of a shaping machine provided with a copier device according to the invention;

FIG. 2 is a cross section of the active portion of the copier device of FIG. 1 taken along a plane normal to the plane of the machine of FIG. 1 and passing through the driving rollers;

FIG. 3 is a diagrammatic perspective view of the main members of the copier device; and FIG. 4 is a cross section of the members which drive the mobile roller taken along the axis of the mobile roller.

DESCRIPTION OF THE PREFERRED EMBODIMENTS.

With reference to the drawings, in which the same parts are indicated with the same reference numerals, 1 generally indicates a shaping machine for wood and the like materials which is of the type in which the machine head is arranged above the work table of the machine. Reference numeral 2 indicates the machine head, 3 indicates the machine spindle, 4 indicates a tool, 5 indicates the machine work table and 6 indicates the side on which there is fitted a unit generally indicated at 7 which is arranged to drive the elements of the copier device associated to the shaping machine.

The unit 7 essentially comprises an electric motor 8 which is secured to a member (not visible in the drawings) which is arranged to vary the position of the electric motor 8 through means (not shown) controlled by a handwheel 9 (FIG. 1). On the shaft of the electric motor 8 there is keyed a variable diameter pulley 10 which, through a belt 11, moves a counter pulley (not visible in the drawings) keyed on a shaft 12 (FIG. 3) borne by supports fixed below the work table 5.

On the other end of said shaft 12 there is mounted a worm screw 13 which meshes with a toothed wheel 14 keyed on a shaft 15 which is arranged for rotation about a vertical axis in supports provided in the lower portion of the worktable 5.

It will be clear that what has been described unto now only constitutes a source of rotary motion which is continuously variable according to the variation ratio due to the pulley 10.

The shaft 15 carries a pinion 16 on which there is wound a chain 17 which is then wound on a pinion 18 keyed on a shaft 19 rotatably arranged in a support similar to that which bears the shaft 15. The shaft 19 is considerably longer than the shaft 15 and extends through a hole 20 in the top of the worktable 5. On the upper end of the shaft 19 there is rigidly mounted a roller 21 whose peripheral edge is covered with material which is designed to exercise a frictional action on wood. This covering material is preferably constituted by a sleeve 22 of relatively thin rubber or similar elastomeric material. The shaft 19 which carries said roller 21 is arranged in precise axial alignment with the spindle 3. In the portion of the machine below the worktable 5 there is also provided a support in which there is engaged an arm 23 which can rotate about a pin parallel to the shaft 19 and whose other end has a cavity 24 whose axis is parallel to the axis of the shaft 19. In the cavity 24 there are housed bearings 25 and 26 which support a relatively long shaft 27 whose upper end projects above the work table 5 through a slot 28. On the portion of the shaft 27 which projects above the work table there is keyed a roller 29 whose peripheral face is covered by a sleeve 30 of rubber or the like material, preferably rubber which is softer than that which constitutes the peripheral face of the roller 21. The sleeve 30 is also somewhat thicker than the sleeve 22 so that the roller 29 has an eternal diameter greater than that of the roller 21. On the lower end of the shaft 27 immediately below the lower bearing 26 there is mounted a washer 30 having an eternal diameter equal to the diameter of the internal ring of the bearing 26. Below the washer 30 there is mounted a metal washer 31 which is of relatively large diameter and acts as a support surface for another washer 32 which consists of a material having a high coefficient of friction. The lower face of the washer 32 abuts against the upper face of a pinion 33 whose lower face abuts against a washer 34 similar to the washer 32. The washer 34 is supported by a metal washer 35 which is urged upward by a cup spring 36. The cup spring 36 reacts on a nut 37 screwed on the shaft 27 and locked in position by a dowel 38.

The pinion 33 engages an eternal portion of the chain 17 and rotates in the opposite direction to that in which the pinion 18 rotates. The roller 29, consequently rotates together with the roller 21 so that an element interposed between the said rollers is caused to advance.

Between the rollers 21 and 29 (see FIGS. 2 and 3) there is held the template 40 which is formed by a piece having a profile similar to that of the molding or shaping to be effected and having a substantially constant thickness. A table 41 (FIG. 2) is fixed by means of screws or nails to the template 40 and the work piece 42 is fixed to the table 41 again by means of screws or nails.

Since the roller 29 has a greater diameter than the roller 21 the adaptation of its peripheral speed to that of the roller 21 and to the development of the template 40 is due to the friction-coupling between its shaft 27 and the pinion 33 which is driven by the eternal portion of the chain 17.

The working of the double roller copier device will now be described.

Since the tool 4 is in axial alignment with the roller 21 the outline of the molding or shaping to be effected is produced on a sheet of plywood and increased in every point of the radius of the roller. A line is drawn parallel to said outline so that at every point between the outline and the new line the distance is comprised between the minimum and the maximum distance which can exist between the bands of the rollers 21 and 29. When this has been done the template is cut following the traced border and is fixed to the under side of the table 41 an whose upper face there is fixed the piece 42 to be worked. The table 41 is then arranged on the worktable 5 so that the template is gripped between the rollers 21 and 29 which project from the worktable. The miller is then started and its working depth adjusted. Thereafter the electric motor 8 is started up and drives the rollers 21 and 29. The speed of the rollers 21 and 29 is adjusted by means of the handwheel 9 so that the correct speed of advance is obtained, this being evidently determined by the entrainment effected by the rollers.

It will be apparent to those skilled in the art that numerous modifications and variations are possible within the scope of the appended claims. Thus, for example, if the copier device is mounted on a planer-type machine the shaft 19 will be hollow so that the machine spindle can pass therethrough.

I claim:

1. A copier device for molding machines, characterized in that it comprises a pair of counterrotating rollers arranged above the worktable of the machine with their axes perpendicular to the surface of the work table, the distance between the axes of the rollers being variable over a limited range of values against the action of resilient means, between said rollers there being interposable a template which has a constant thickness and is fixed to the lower side of a table which carries a piece to be worked, said rollers being rotated in opposite directions by a rotary motion source, and at least one of said rollers being connected to said rotary motion source by means which enable the roller to rotate at a variable peripheral speed with respect to the other roller.

2. A copier device as claimed in claim 1, in which one of said rollers is coaxial with the spindle of said machine, the other roller having a greater diameter than the roller coaxial with the machine spindle and being driven through a friction coupling, the motion of said rollers being transmitted by a chain which is wound on a pinion mounted on the shaft of the smaller diameter roller, said chain engaging externally a pinion mounted on the shaft of the larger diameter roller.